United States Patent [19]

Attix et al.

[11] Patent Number: 4,842,809
[45] Date of Patent: Jun. 27, 1989

[54] VERTICAL CLOSE PACK ROD ARRAYING SYSTEM

[75] Inventors: Douglas J. Attix; Michael J. Kelly; Fred L. Mason; Carlton E. Stinnett, all of Lynchburg, Va.

[73] Assignee: The Babcock & Wilcox Company, New Orleans, La.

[21] Appl. No.: 181,858

[22] Filed: Apr. 15, 1988

[51] Int. Cl.⁴ .............................................. G21C 19/00
[52] U.S. Cl. ..................................... 376/261; 53/236
[58] Field of Search ...................... 376/261, 272, 260; 53/149, 236, 244; 29/723, 468, 400 N; 206/443; 414/146, 745

[56] References Cited

U.S. PATENT DOCUMENTS

| | | | |
|---|---|---|---|
| 4,441,242 | 4/1984 | Hicken et al. | 376/261 |
| 4,474,727 | 10/1984 | Kmonk et al. | 376/272 |
| 4,636,351 | 1/1987 | Rohr | 376/272 |
| 4,659,536 | 4/1987 | Baudro | 376/261 |
| 4,683,110 | 7/1987 | Baudro et al. | 376/261 |
| 4,715,111 | | or et al. | 29/723 |

Primary Examiner—Deborah L. Kyle
Assistant Examiner—Daniel Wasil
Attorney, Agent, or Firm—Robert J. Edwards; D. Neil LaHaye

[57] ABSTRACT

A rod arraying system for nuclear fuel rods or burnable poison rods. A support structure positions a consolidation canister vertically to receive the rods. A rod loading pattern provides a gap between rods to allow projections to hold each rod in position. One or more rod arraying devices positioned vertically along and inclined toward the canister provide a triangular pitch loading configuration. A guide assembly slidably mounted on the mounting base of the rod arraying device has two guide plates with scalloped edges. The guide plates are offset relative to each other with one being cycled back and forth by an air cylinder to allow individual loading of fuel rods one row at a time. The inclined weight of the guide plates keeps them in position against the rods to prevent unwanted shifting of rods during the loading operation.

17 Claims, 7 Drawing Sheets

VERTICAL CLOSE PACK ROD ARRAYING SYSTEM

BACKGROUND OF THE INVENTION

1. Field of the Invention

The invention is related to storage of nuclear fuel rods and in particular to a rod arraying system which consolidates two fuel assemblies into the rack space of one standard fuel assembly.

2. General Background

Storage space at nuclear reactor sites is very limited. This results in a need to be able to consolidate nuclear fuel being stored. A consolidation ratio of 2 to 1 can be obtained by disassembling two fuel assemblies and repackaging the fuel into one canister which will fit into the same rack space as a standard fuel assembly. Since there is seldom enough space at a utility to allow horizontal handling of fuel, the majority of existing designs and equipment directed toward fuel consolidation handle fuel in a vertical orientation. In most of these systems fuel rods are pulled or pushed from a fuel assembly in groups or bundles and put into a funnel which reconfigures the fuel rod bundle. Bundles may contain a full complement of rods for a complete fuel assembly or rods from a partial assembly. The funnel is a long device that accepts a rod bundle at one end in the same configuration as it is taken from a fuel assembly (rectangular pitch) and gradually changes the configuration of the bundle into a close packed triangular pitch rod configuration at the other end. The reconfigured rods are then fed into a canister for storage.

This approach to fuel rod consolidation has met with limited success since it does not lend itself to quick recovery from an off normal situation such as a broken fuel rod. The funnel approach does not lend itself to other fuel related operations such as burnable poison rod consolidation and does not support fuel reconstitution, eddy current inspection, and recaging of damage fuel assemblies. It can be seen that a more versatile concept is needed in this area.

SUMMARY OF THE INVENTION

The present invention solves the above problem in a straightforward manner. What is provided is a rod arraying device which uses the principle of single rod transfer. The handling of one rod at a time affords the most operational control and eliminates the chance of major portions of fuel assemblies getting hung up as a result of equipment failures, power failures, or rod breakage. The rod arraying device works in conjunction with the consolidation canister. The rod arraying device has two scalloped plates with identical edge profiles. The plates are laid one on top of the other and offset in the front-to-back and side-to-side directions. The relative position of the plates is maintained by bearing guides which allow forward and backward cycling of the bottom guide by an air cylinder. The rod loading pattern provides gaps between rods that allow the rod arraying devices to hold each rod in position.

BRIEF DESCRIPTION OF THE DRAWINGS

For a further understanding of the nature and objects of the present invention, referecne should be made to the following, taken in conjunction with the accompanying drawings in which like parts are given like reference numerals and, wherein.

DETAILED DESCRIPTION OF THE PREFERRED EMBODIMENT

Figure 1:
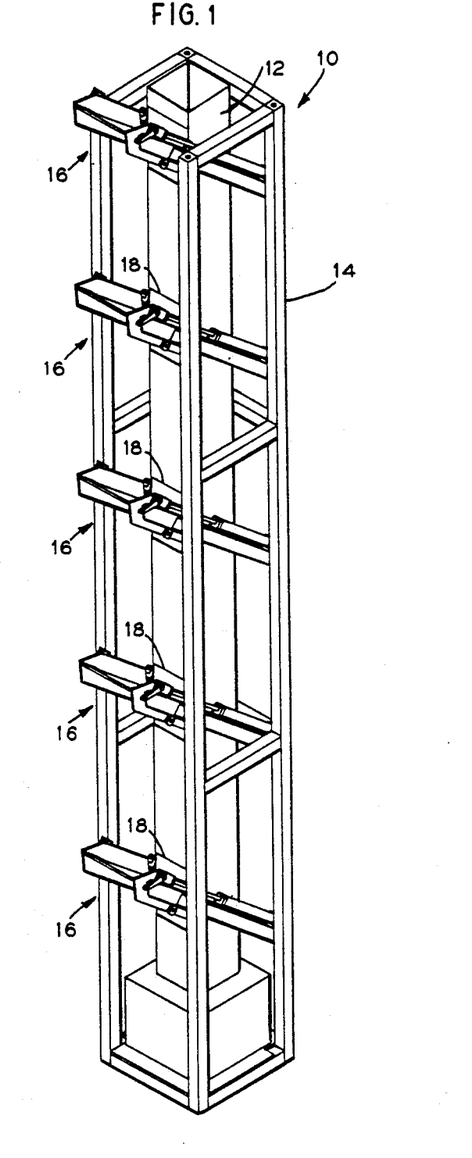
FIG. 1 is an overall view of the invention.

Referring to the drawings, it can be seen in FIG. 1 that the invention is generally indicated by the numeral 10. Rod arraying system 10 is generally comprised of a consolidation canister 12, a rigid support structure 14, and a rod arraying device 16.

Figure 11:
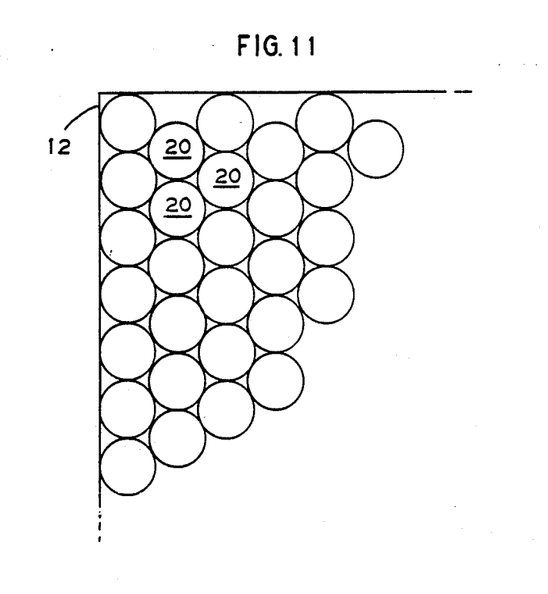
FIG. 11 is a top partial view of a consolidation canister with fuel rods loaded in a triangular pitch.

Consolidation canister 12 is essentially a standard storage and transfer canister for fuel rods and burnable poison rods which has been modified by the addition of several horizontal holes or windows 18 spaced vertically along one side. A portion of rod arraying device 16 enters consolidation canister 12 through each window 18 for alignment of fuel rods 20 as they are inserted into canister 12. As seen in FIG. 11, rod arraying device 16 positions fuel rods 20 in a triangular pitch configuration inside canister 12 to achieve the desired 2 to 1 consolidation ratio. Consolidation canister 12 is supported in a vertical position for receiving fuel rods by rigid support structure 14.

Rigid support structure 14 is generally a framework structure sized to receive and support consolidation canister 12. Support structure 14 also has rod arraying device 16 mounted thereon as seen in FIG. 1.

Figure 5:
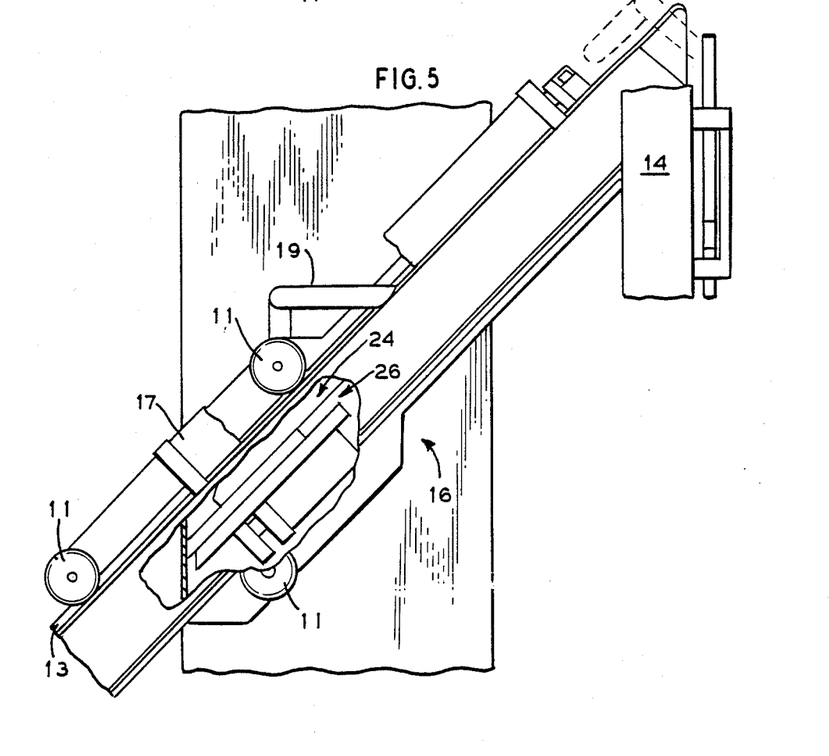
FIG. 5 is a side view of the inclined rod arraying device.
Figure 9:
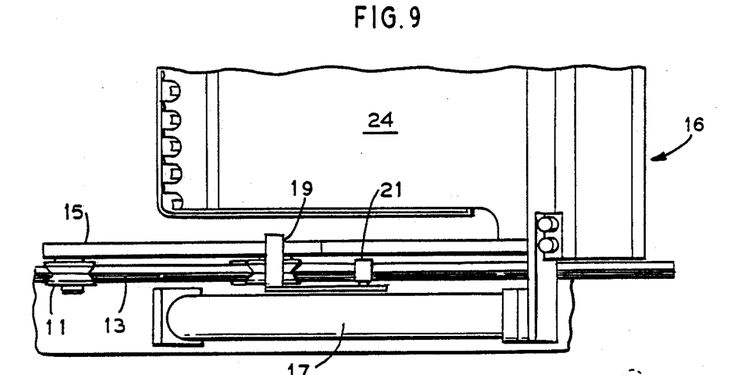
FIG. 9 is a partial top view of the inclined rod arraying device.

Rod arraying device 16 is generally comprised of a mounting base 24 and guide assembly 26. In the preferred embodiment, guide assembly 26 is attached to mounting base 24, as shown in FIG. 5 and 9. Mounting base 24 is guided on support structure 14 by way of wheels 11 and rails 13. The wheels 11, for which there are six, are mounted to the mounting base 24 by way of two mounting blocks 15, one on each side of the mounting base 24. The wheels 11 ride on rails 13 which are mounted to the support structure 14 on an incline, such that the guide assembly 26 and mounting base 24 is predisposed toward the inside of canister 12. In the preferred embodiment, the rod arraying device 16 exerts a force on rods 20, proportional to the angle of inclination and the weight of said device. Retraction of the inclined, rod arraying device 16 from canister 12 for removal of said device or for the purpose of installing or removing canister 12 is accomplished in one of two ways. Cylinder 17, seen in FIG. 5, 9 is attached to support structure 14 and the rod of cylinder 17 bears against mounting base 24 such that extension of said rod pushes rod arraying device 16 out of canister 12. Retraction of rod arraying device 16 is maintained by keeping pressure on cylinder 17. Latch 19 is provided as a redundant feature. Latch 19 is pivotally attached to mounting block 15. Roller 21 of latch 19 rides on rail 13. Upon withdrawal of inclined, rod arraying device 16 from canister 12, latch 19 catches on the upper end of rail 13, and holds rod arraying device 16 in the retracted position. Latch 19 is disengaged by operating the release mechanism 23 mounted on support structure 14, or by a hook on the end of a remotely operated pole (not shown). For exclusive use of cylinder 17, latch 19 can be made inoperative by rotating said latch back against mounting block 15.

Figure 2:
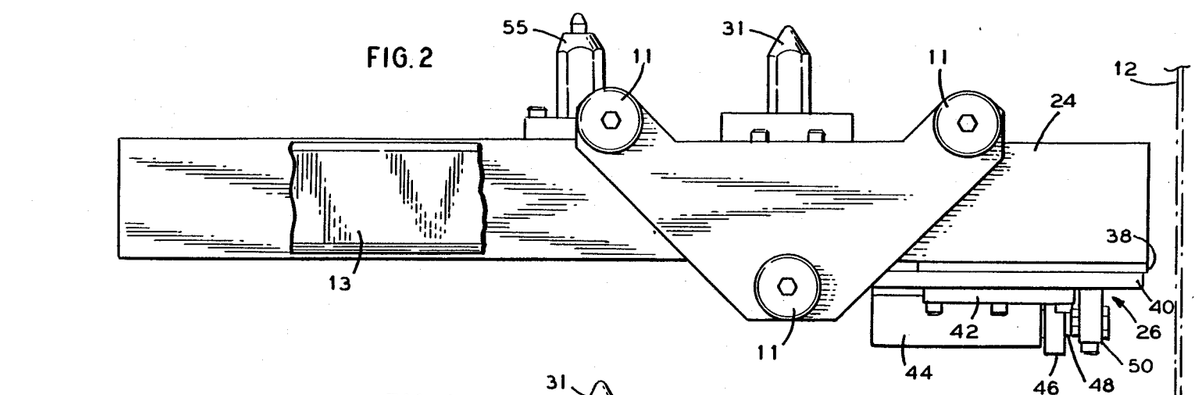
FIG. 2 is an elevation view of the rod arraying device.
Figure 4:
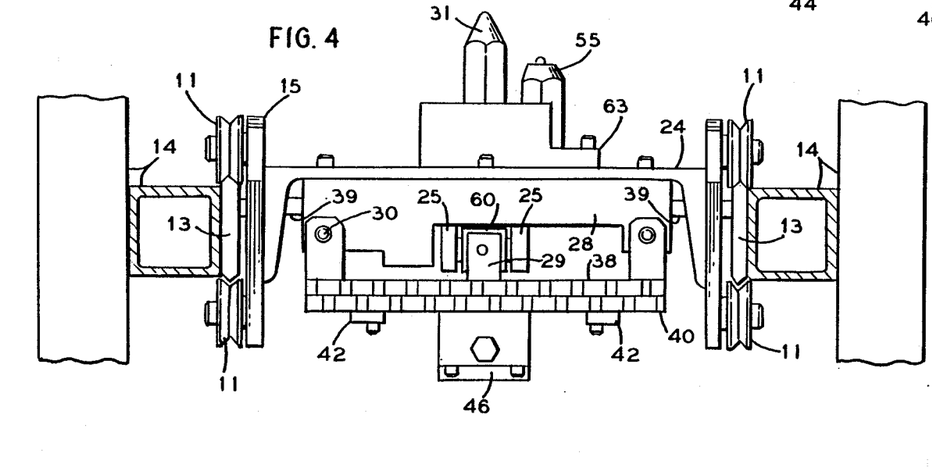
FIG. 4 is a view taken along the lines 4—4 in FIG. 3.
Figure 7:
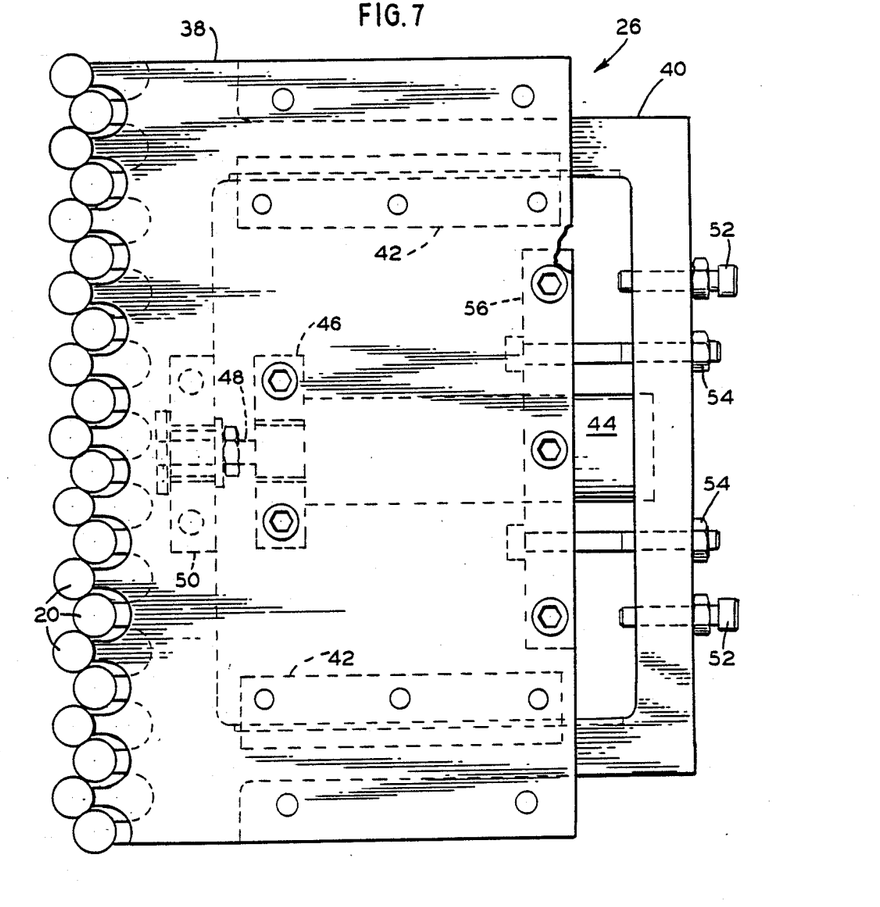
FIG. 7 is a partial top view of the rod arraying device.

Guide assembly 26 is comprised of two guide plates 38, 40 as best seen in FIGS. 2, 4, and 7. As seen in FIG. 7, guide plates 38, 40 have identical front scalloped edges which are sized to fit nuclear fuel rods and burnable poison rods. The plates are positioned one over the other in a front-to-back and side-to-side offset configuration such that the projections on the front edges of the plates alternate between the two plates. Lower guide plate 40 is slidably mounted to upper guide plate 38 by means of bearing guides 42 to permit forward and backward cycling of lower guide plate 40 during operation. Bearing guides 42 are mounted to the underside of upper guide plate 38. Upper guide plate 38 is slidably mounted on mounting base 24 by means of guide bars 30.

Means for causing forward and backward cycling of lower guide plate 40 relative to upper guide plate 38 is provided in the form of air cylinder 44. As seen in FIG. 2 air cylinder 44 is mounted to a block 46 which extends from the bottom of upper guide plate 38. Cylinder rod 48 extends forward of air cylinder 44 and is attached to plate 50 which extends down from lower guide plate 40. In this manner, cycling of air cylinder 44 causes cylinder rod 48 and lower guide plate 40 to move forward and backward relative to upper guide plate 38. The range of relative motion between the two guide plates is controlled by the cylinder stroke, or by adjustable stops 52, 54 seen in FIG. 7. Forward stops 52 are threadably engaged in and extend forward through lower guide plate 40 to control forward travel by making contact with stop bar 56. Rearward stops 54 are slidably engaged in stop bar 56 and extend rearwardly thereof in threaded engagement with lower guide plate 40 to control rearward travel of lower guide plate 40.

Figure 3:
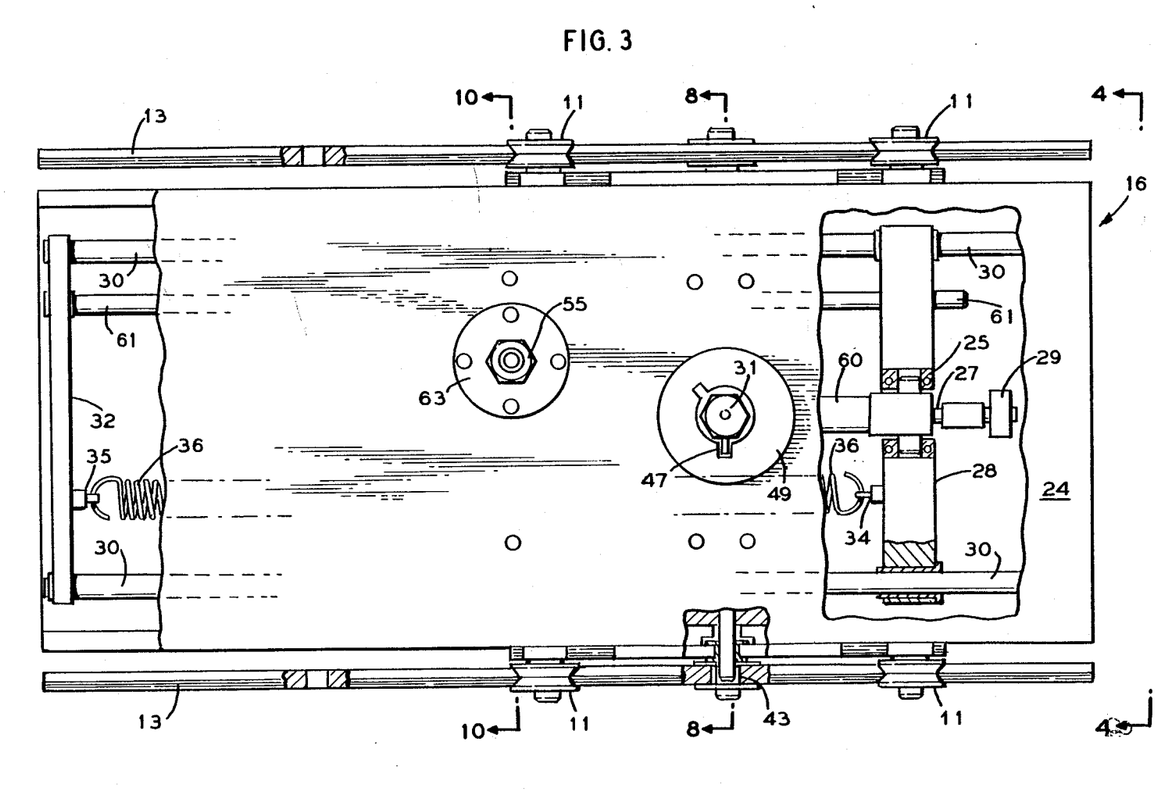
FIG. 3 is a top view of the rod arraying device.

In an alternate embodiment of the invention rod arraying device 16 may be positioned in a horizontal orientation relative to canister 12. Mounting base 24 is provided with bearing blocks 28 with bores therethrough sized to slidably receive guide bars 30. As best seen in FIGS. 3 and 4 guide bars 30 are mounted on the top of guide assembly 26 and extend rearwardly therefrom. Bushings may also be mounted in the bores provided to reduce friction and wear between bearing blocks 28 and guide bars 30. For ease of illustration, the structural differences of the alternate embodiment are shown as additional structure in the drawings of the preferred embodiment. A cross bar 32 is attached to and bridges the end of guide bars 30 farthest from guide assembly 26. An attachment point is provided for a spring in the alternate embodiment as illustrated in FIG. 3. A first fixed spring anchor 34 is provided near the forward end of mounting base 24 and may be attached to bearing block 28. A second spring anchor 35 is attached to the cross bar 32. Spring 36 is attached between the two anchor points. Since guide bars 30 are attached to guide assembly 26, the spring and anchor combination serves as a means for biasing guide assembly 26 forward away from mounting base 24 and toward and into consolidation canister 12. The mounting base 24 is prohibited from rolling by way of the two-position locking mechanism 62.

Figure 6:
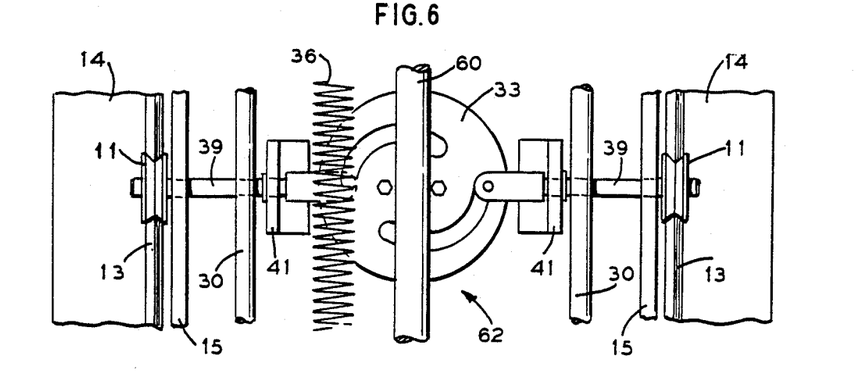
FIG. 6 is a bottom view of the two-position locking mechanism.
Figure 8:
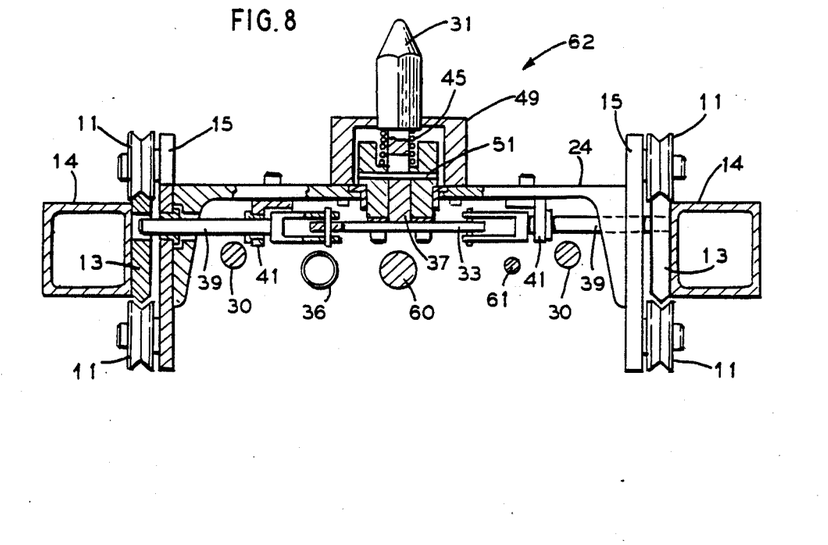
FIG. 8 is a view taken along the lines 8—8 in FIG. 3.

In the alternate embodiment means for locking guide assembly 26 in a retracted position to allow removal and installation of consolidation canister 12 is provided in the form of two-position locking mechanism 62 seen in FIG. 6 and 8. The two-position locking mechanism 62 is actuated by rotating a nut 31 connected to cam 33 by way of shaft 37. Rotation of cam 33 provides push-pull motion to locking shafts 39. Cam 33 is provided with slots to which locking shafts 39 are pivotally attached. Locking shafts 39 are slidably engaged to mounting base 24 by way of guide blocks 41. In addition to guide blocks 41, the locking shafts 39 are slidably engaged in holes in mounting base 24. When the locking mechanism 62 is actuated, the locking shafts 39 engage holes 43 in the rails 13 as shown in FIG. 3 and 8. There are two sets of holes in rails 13. One set is for locking the rod arraying device 16 in the outermost position, out of canister 12 for canister installation and removal operations. The second set of holes is used to lock the rod arraying device 16 in place during canister loading. Nut 31 is biased upward with spring 45, so that in the upward position the nut 31 is prevented from turning by pin 47 which is fixed in nut 31 and protrudes from nut 31 into a slot in locking plate 49. Nut 31 is rotated by a socket on the end of a remotely operated pole (not shown). When a small, downward force is applied to nut 31, pin 47 disengages from locking plate 49 and nut 31 is free to rotate. Vertical travel of nut 31 and shaft 37 is limited by the length of the slot in shaft 37 and vertical limit pin 51 which is fixed in guide post 53.

Figure 10:
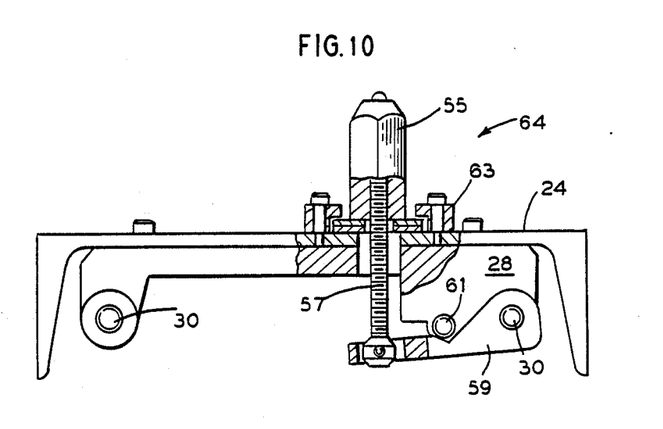
FIG. 10 is a view taken along the lines 10—10 in FIG. 3.

In the alternate embodiment means for locking out the spring tension between guide assembly 26 and mounting base 24 is provided in the form of guide extension lock 64 seen in FIG. 10. In the case of remote removal of rod arraying device 16 (as when in need of repair), guide extension lock 64 is used. Guide extension lock 64 provides a way to lock the guide assembly 26 any place in its travel, negating the effect of spring 36, and facilitating subsequent unlatching of the two-position locking mechanism 62. Before remote installation of rod arraying device 16 (such as after repair), guide extension lock 64 is locked so that the extension of guide assembly 26 falls short of the last row of rods 20 when the rod arraying device 16 is latched in the locked-in position (by operating the two-position, locking mechanism 62). After the rod arraying device 16 is latched in the locked-in position, the guide extension lock 64 is released so that the guide assembly 26 can approach and rest against rods 20. Guide extension lock 64 is actuated by rotating nut 55 which is fixed to threaded stud 57. Threaded stud 57 is pivotally attached to clamping arm 59 which is pivotally attached to rear bearing block 28. Rear bearing block 28 is provided with a clearance hole for guide rod 61. Clamping arm 59 is provided with a notch to facilitate clamping of guide rod 61. Guide rod 61 is attached to movable spring anchor 32. Nut 55 is rotated by a socket on the end of a remotely operated tool (not shown). Nut 55 is captured by cap 63 but is free to rotate.

Means for dampening the movement of guide assembly 24 is provided in the form of dashpot 60 seen in FIG. 3. After remote installation of rod arraying device 16, and after latching rod arraying device 16 in the locked-in position, guide extension lock 64 is released. Upon release, dashpot 60 works to slow the advancement of guide assembly 26 into canister 12. Dashpot 60 is a cylinder which draws in and expels pool water through orifices mounted in the cylinder ports. Dashpot 60 is trunnion mounted to front bearing block 28 in pivot blocks 25. Cylinder rod 27 is attached to rod mounting block 29 which is attached to upper guide plate 38.

During operation, consolidation canister 12 is first placed in position. Before installation of canister 12, each rod arraying device 16 is placed in the locked-out position using either cylinder 17 or two-position locking mechanism 62. With rod arraying device 16 in position on support structure 14, guide assembly 26 is inserted into canister 12 through window 18. Lower guide plate 40 is retracted relative to upper guide plate 38 at the start so that upper guide plate 38 bears against the inside wall of canister 12. It is seen in FIG. 1 that a plurality of rod arraying devices 16 are used in the preferred embodiment along the longitudinal axis of canister 12. Fuel rods 20 are loaded one at a time into canister 12 through the scallop spaces in upper guide plate 38. The loading pattern of the rods provides gaps between adjacent rods in each row which allow the projections (front scalloped edges) to hold each rod in position. After the first row is loaded guide assembly 26 is cycled to cause lower guide plate 40 to extend forward beyond upper guide plate 38. This places the projections on lower guide plate 40 against the first row of fuel rods 20, holds the first row against the inside surface of canister 12, and provides room for loading the second row through the scallop spaces on lower guide plate 40. Once the second row is loaded, lower guide plate 40 is retracted. Pressure from the weight of inclined rod arraying device 16 then biases the projections of upper guide plate 38 against the second row of fuel rods 20. The provides room for loading the third row through the scallop spaces in upper guide plate 38. It can be seen that this is essentially a repetition of the position of the device used in loading the first row. The process is then repeated until canister 12 is full or the desired consolidation ratio is achieved.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed is:

1. A rod arraying system, comprising:
   a. a rigid support structure;
   b. a canister positioned in and supported by said support structure;
   c. means for positioning rods inside said canister mounted on said support structure adjacent said canister, comprising:
      i. a mounting base slidably attached to said support structure on an incline; and
      ii. a guide assembly attached to said mounting base; and
   d. means for locking said mounting base and guide assembly in a retracted position away from said canister.

2. The system of claim 1, wherein said canister is provided with a window for receiving said rod positioning means.

3. The system of claim 1, further comprising means for dampening the movement of said guide assembly.

4. A rod arraying system, comprising:
   a. a rigid support structure;
   b. a canister positioned in and supported by said support structure;
   c. means for positioning rods inside said canister mounted on said support structure adjacent said canister, comprising:
      i. a mounting base slidably attached to said support structure on an incline; and
      ii. a guide assemlby attached to said mounting base, comprising:
         1. an upper guide plate mounted on said mounting base;
         2. a lower guide plate slidably mounted on said upper guide plate; and
         3. an air cylinder mounted on said upper guide plate and in operative engagement with said lower guide plate for causing forward and backward cycling of said lower guide plate relative to said upper guide plate.

5. The system of claim 4, wherein said lower guide plate is mounted on said upper guide plate in an offset side-to-side and front-to-back configuration.

6. The system of claim 4, wherein said upper and lower guide plates are provided with identical front scalloped edges.

7. A rod arraying system, comprising:
   a. a rigid support structure;
   b. a canister positioned in and supported by said support structure;
   c. a mounting base slidably attached to said support structure on an incline;
   d. a guide assembly attached to said mounting base for positioning rods inside said canister, comprising:
      i. an upper guide plate mounted on said mounting base;
      ii. a lower guide plate slidably mounted on said upper guide plate;
      iii. means for causing forward and backward cycling of said lower guide plate relative to said upper guide plate; and
   e. said canister having a window for receiving said guide assembly.

8. The system of claim 7, further comprising means for dampening the movement of said guide assembly.

9. The system of claim 7, further comprising means for locking said mounting base and guide assembly in a retracted position away from said canister.

10. The system of claim 7, wherein said cycling means comprises an air cylinder mounted on said upper guide plate and in operative engagement with said lower guide plate.

11. The system of claim 7, wherein said lower guide plate is mounted on said upper guide plate in an offset side-to-side and front-to-back configuration.

12. The system of claim 7, wherein said upper and lower guide plates are provided with identical front scalloped edges.

13. A rod arraying system, comprising:
   a. a rigid support structure;
   b. a canister positioned in and supported by said support structure;
   c. a mounting base slidably attached to said support structure and inclined toward said canister;
   d. an upper guide plate mounted on said mounting vbase;

e. a lower guide plate slidably mounted on said upper guide plate in an offset configuration;

f. means for causing forward and backward cycling of said lower guide plate relative to said upper guide plate for positioning of rods as they are inserted into said canister; and g. said canister having a window for receiving said upper and lower guide plates.

14. The system of claim 13, further comprising a dashpot mounted on said upper guide plate for dampening the movement of said guide plates relative to said mounting base.

15. The system of claim 13, wherein said upper and lower guide plates are provided with identical front scalloped edges.

16. The system of claim 15, wherein said system causes arraying of said rods in a pattern that provides gaps between adjacent rods which allow said front scalloped edges to hold each rod in position.

17. A rod arraying system, comprising:

a. a rigid support structure;

b. a canister positioned in and supported by said suport structure;

c. means for positioning rods inside said canister mounted on said support structure adjacent said canister, comprising:

i. a mounting base slidably attached to said support structure; and ii. a guide assembly attached to said mounting base; and d. means for locking said mounting base and guide assembly in a retracted position away from said canister.

* * * * *